G. W. JENNINGS,

Assignor to E. A. HILDRETH.

Hand Mowing-Machine.

No. 8,630 Reissued Mar. 18, 1879.

*Attest:*

S. B. Hildreth

T. T. Crane

*Inventor:*

George W. Jennings

THE NORRIS PETERS CO., PHOTO-LITHO., WASHINGTON, D. C.

UNITED STATES PATENT OFFICE.

GEORGE W. JENNINGS, OF BOSTON, ASSIGNOR TO EDWIN A. HILDRETH, OF HARVARD, MASSACHUSETTS.

IMPROVEMENT IN HAND MOWING-MACHINES.

Specification forming part of Letters Patent No. 47,022, dated March 28, 1865; Reissue No. 8,630, dated March 18, 1879; application filed February 6, 1879.

*To all whom it may concern:*

Be it known that I, G. W. JENNINGS, of Boston, in the county of Suffolk and State of Massachusetts, have invented a new and Improved Hand Mowing-Machine; and I do hereby declare that the following is a full, clear, and exact description thereof, which will enable others skilled in the art to make and use the same, reference being had to the accompanying drawings, forming part of this specification, in which—

Figure 1:
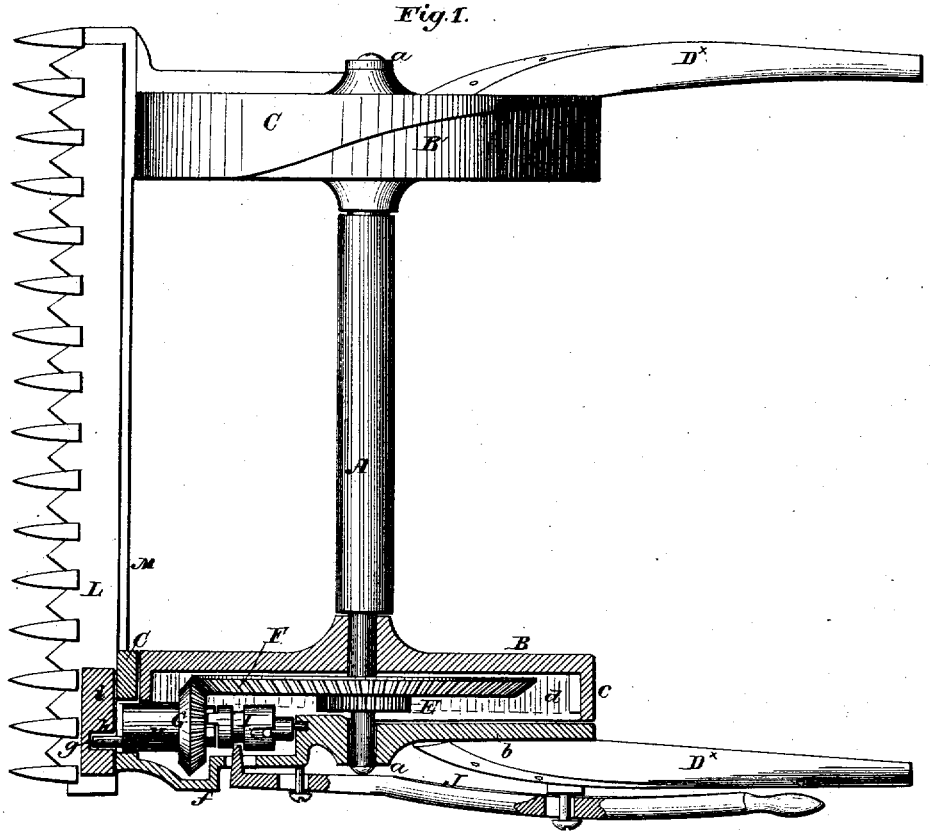
Figure 2:
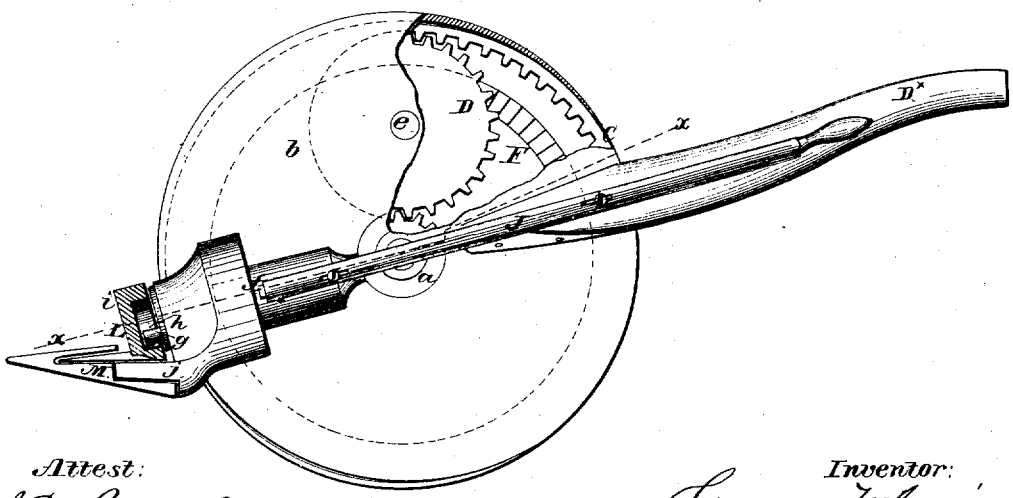

Figure 1 is a plan or top view of my invention, partly in section, as indicated by the line *x x*, Fig. 2. Fig. 2 is a side view of the same, partly in section.

Similar letters of reference indicate like parts.

The nature of my invention consists in certain improvements in hand mowing-machines, in the gearing, and in protecting and incasing the gearing from the fine-cut grass, from dust, dirt, grit, or any obstructions which might injure, obstruct, or strain the gearing; also, in the construction of the main frame of the mower, so as to make a compact, light, and strong machine, which shall be completely under the control of the operator, and well adapted for the work for which such a machine is designed, all as hereinafter more fully described in the specification and pointed out in the claims.

A represents an axle, having wheels B B′ placed loosely on its ends. The wheels B B′ are hollow, forming box or cupped wheels.

The whole open face of the box-wheel B is covered by a side covering-plate, *b*, which is permanently attached to the axle of the wheel.

The other wheel, B′, may be similarly constructed; but it has no internal gearing.

*b b* are side covering-plates, which completely cover the open faces of the cupped or box wheels, and protect completely the gearing within said wheels.

The side covering-plates, *b b*, are secured to the ends of the axle A by screws *a*. The side covering-plates, *b b*, are also each provided with a cap or flange, C, firmly secured to said side covering-plates, *b*, the caps C wholly or partially covering the front and upper portion of the wheels B B′.

The covering-plates *b b* are each provided with a handle, D×.

The wheel B is provided, at the inner surface of its rim *c*, with teeth or cogs *d*, forming an internal gear, into which a pinion, D, gears, the latter having its axis *e* secured to the plate *b*. (See Fig. 2.) The pinion D also gears into another pinion, E, which is attached to or cast concentrically with a bevel-wheel, F, the latter being within wheel B, and placed loosely on the axle A.

The bevel-wheel F gears into a bevel-pinion, G, which is placed loosely on a shaft, H, the latter having its bearings in the plate *b*, and covered by the cap *f*, which also covers the pinion G at the outer side of *b*.

The pinion G is connected with the shaft H, when desired, by means of a toothed clutch, I; or a friction-clutch may be used instead, and I consider the latter preferable. This clutch is operated by a lever, J, at the outer side of plate *b*, and the handle D×, which is attached to it.

The front end of the shaft H is provided with a crank-pin, *g*, which is fitted and works in a vertical slot, *h*, in an upright lug, *i*, at one end of the sickle-bar L, the sickle being placed upon the finger-bar M, which is secured by bolts to lips *j* on the caps C.

From the above description it will be seen that when the machine is shoved along and the pinion G is connected to the shaft H, a reciprocating movement will be communicated to the sickle, and it will be seen that a very rapid movement may be given it by a very compact arrangement of parts; and it will further be seen that the finger-bar and sickle may be moved upward or downward from the axle A as a center without in the least affecting the sickle-driving mechanism.

The operator, therefore, will have full control over the implement, and may raise or depress the sickle to cut the grass high or low, as desired, or to pass over obstructions. The implement also may be manufactured at a moderate cost, and it contains no parts liable to become deranged by use.

All the sickle-driving mechanism is fully covered and protected from dust, dirt, cut grass, and other substances which would have a tendency to choke or clog it and render breakage or a straining of the working parts probable.

Having thus described the construction and operation of my improved hand mowing-machine, what I claim as new, and desire to secure by Letters Patent, is—

1. The combination, in a hand or lawn mowing-machine, of two cupped or box wheels, gearing within the periphery of the driving-wheel, covering-plates covering the whole open face of said box-wheels and gearing, and a cutting apparatus extending across the machine, and suspended at each end by said covering-plates from the axles of said wheels, substantially as shown and described.

2. The stationary side plates fully covering the open faces of the cupped or hollow carrying-wheels, said covering-plates being connected from side to side by a cross-rod extending from one to the other, and to which both side plates are rigidly secured.

3. The combination, in a hand or lawn mowing-machine, with two supporting-wheels and gearing within the periphery of the driving-wheel, of a pivoted frame directly supporting the cutting apparatus, and inclosing and protecting the gearing for driving the same, substantially as described.

4. A hand or lawn mowing-machine in which are combined two supporting-wheels, one upon each side of the machine, internal gearing for driving the cutting apparatus, side plates fully covering and protecting the internal gearing, a cutting device secured at both ends to said side covering-plates, and the handles for pushing the mower forward, also secured to said side covering-plates, substantially as shown and described.

5. The combination, in a hand or lawn mowing-machine, of the stationary side plates, fully covering the open faces of the cupped or hollow carrying-wheels, with a cross-rod extending from one side plate to the other, and to which both side plates are rigidly secured, and a cutting apparatus supported from and also connecting said side plates, substantially as shown and described.

6. The combination, in a hand or lawn mowing-machine, of the side covering-plates mounted on the axles of the main supporting-wheels, and inclosing and supporting the gearing, with the handles for pushing the mower forward secured to said side covering-plates.

7. The combination, in a hand or lawn mowing-machine, of supporting-wheels upon each side of the machine, turning loosely upon their axles, internal gearing, side plates, fully covering and protecting said internal gearing, axles rigidly secured to said side plates, and on which said supporting-wheels revolve, and a spur gear or pinion, also supported in position by said side plates, and engaging with the cogs of the internal gearing, to produce the motion from which the cutting device is driven.

GEORGE W. JENNINGS.

Witnesses:
O. F. CRANE,
S. B. HILDRETH.